(12) United States Patent
Ota

(10) Patent No.: US 6,717,827 B2
(45) Date of Patent: Apr. 6, 2004

(54) SWITCHING POWER SUPPLY

(75) Inventor: Hiroyuki Ota, Nagano (JP)

(73) Assignee: Fuji Electric Co., Ltd, Kawasaki (JP)

( * ) Notice: Subject to any disclaimer, the term of this patent is extended or adjusted under 35 U.S.C. 154(b) by 0 days.

(21) Appl. No.: 10/319,681

(22) Filed: Dec. 16, 2002

(65) Prior Publication Data

US 2003/0117818 A1 Jun. 26, 2003

(30) Foreign Application Priority Data

Dec. 21, 2001 (JP) ........................................ 2001-388780

(51) Int. Cl.[7] ............................................. H02M 3/335
(52) U.S. Cl. .................................. 363/21.12; 363/21.16
(58) Field of Search ................................. 363/20, 21.01, 363/21.04, 21.12, 21.15, 21.16, 95, 97

(56) References Cited

U.S. PATENT DOCUMENTS 5,654,880 A * 8/1997 Brkovic et al. ................ 363/17
6,466,463 B1 * 10/2002 Morita ..................... 363/21.16
6,639,813 B2 * 10/2003 Yamagishi et al. ...... 363/21.12

FOREIGN PATENT DOCUMENTS

JP  9-131055  5/1997

* cited by examiner

*Primary Examiner*—Adolf Berhane
(74) *Attorney, Agent, or Firm*—Kanesaka and Takeuchi

(57) ABSTRACT

A switching power supply includes a noise filter; a bridge rectifying circuit; a smoothing capacitor; a primary winding of a transformer and a switching element; and a control circuit for controlling the switching element. Further, the first reactor and the first diode are connected sequentially in series between one output terminal of the bridge rectifying circuit and one terminal of the smoothing capacitor. The second reactor and the second diode are connected in series between a node that mutually connects the first reactor and the first diode and a node that mutually connects the primary winding and the switching element.

6 Claims, 4 Drawing Sheets

SWITCHING POWER SUPPLY

BACKGROUND OF THE INVENTION AND RELATED ART STATEMENT

The present invention relates to an insulated switching power supply for supplying DC power from a bridge-rectified output-smoothed DC voltage source through a transformer and a switching element to a load, and more particularly, relates to techniques for improving an input power factor and for decreasing switching loss and steady-state loss of a switching power supply.

FIG. 5 shows a configuration of a conventional switching power supply that uses a typical choke input-type smoothing circuit to improve the power factor (refer to Japanese Patent Publication (Tokkai) No. 09-131055).

In FIG. 5, a reference number 1 designates an AC supply, reference numbers 2 and 4 designate capacitors, a reference number 3 designates a common mode reactor having two coils wound with the same polarity around the same core, a reference number 5 designates a bridge rectifying circuit, a reference number 6 designates a smoothing capacitor, a reference number 7 designates a transformer, a reference number 7a designates a primary winding, a reference number 7b designates a secondary winding, a reference number 8 designates a switching element, a reference number 9 designates a diode, a reference number 10 designates a smoothing capacitor, a reference number 11 designates a load, a reference number 12 designates a control circuit for controlling a switching operation of the switching element 8, and a reference number 13 designates a choke coil.

Here, the capacitors 2 and 4, together with the common mode reactor 3, form a common mode noise filter. The noise filters which omit the capacitor 2 or capacitor 4 from the above described circuit configuration are well known to those skilled in the art. The noise filter which has any of the circuit configurations described above is called the "normal mode noise filter". The normal mode noise filter removes the normal mode noise current which flows through the positive and negative output lines of the bridge rectifying circuit 5. For simply forming a normal mode noise filter, a reactor having one single winding may be used in substitution for common made reactor 3.

Although not illustrated, a common mode noise filter is formed by grounding each winding of the common mode reactor 3 via a capacitor. The common mode noise filter is used to remove the common mode noise current which flows between the positive and negative output lines of the bridge rectifying circuit 5 and the ground concurrent with the switching operation of switching element 8.

In the abovementioned configuration, a choke input-type smoothing circuit comprised of the choke coil 13 and the smoothing capacitor 6 smoothes a full-wave rectified DC voltage output from the bridge rectifying circuit 5. Then, through the switching operation of the switching element 8, the voltage is supplied through the transformer 7, the diode 9, and the smoothing capacitor 10 to the load 11 as a nearly constant DC voltage. The control circuit 12 controls an ON/OFF duty cycle of the switching element 8 with pulse-width modulation (PWM) or other means so as to adjust the aforementioned DC voltage at a desired value.

A charging current is supplied to the smoothing capacitor 6 from the AC supply 1 through the noise filter, the bridge rectifying circuit 5, and the choke coil 13. According to an inductance value of the choke coil 13, a peak value of the charging current is suppressed, and a conduction time is increased. Namely, the choke coil 13 smoothes the charging current flowing to the smoothing capacitor 6, thereby improving the power factor (Japanese Patent Publication No. 9-131055).

However, since this switching power supply is used at a commercial switching frequency or twice that frequency, the choke coil 13 requires a large inductance of at least several mH, resulting in a large size and a heavy weight not suitable for practical applications.

Moreover, because of the large inductance, the number of coil windings increases. Accordingly, a voltage drop due to the resistance of the windings becomes larger and an intermediate DC voltage decreases. Therefore, an effective current flowing through the switching element increases, thereby causing problems such as an increased switching loss and decreased efficiency of the power supply.

As shown in FIG. 6, to achieve a power factor of nearly 1 and remove high frequency components from the input current, it is known that a switching power supply may use a method known as power factor correction (PFC) to convert an input current into an approximate sine wave.

In FIG. 6, a reference number 14 designates the second switching element, a reference number 15 designates a diode, a reference number 16 designates a current sense resistor, a reference number 17 designates an inductor, a reference number 18 designates the second control circuit, and other circuit elements are the same as in FIG. 5. Here, a voltage of the smoothing capacitor 6 and a current value sensed by the current sense resistor 16 are input to the second control circuit 18. The second switching element 14 is turned on and off based on these input signals.

In this example of the prior art, the inductor 17, the second switching element 14, the diode 15, the smoothing capacitor 6, the current sense resistor 16, and the second control circuit 18 form a boost converter. The PWM control of the switching element 14 by the control circuit 18 makes the input current waveform sinusoidal to remove the high frequency components and improve the power factor.

The switching power supply shown in FIG. 6 requires two control circuits 12 and 18, and consequently has a complex circuit configuration and a high cost. Moreover, not many applications need to remove all of the high frequency components contained in the input current while maintaining a power factor of nearly 1. For most applications, since it is sufficient to suppress the high frequency components to a set value or below as specified by a specification or the like, this switching power supply is also wasteful in regard to functionality and a cost.

Therefore, an object of the present invention is to provide a switching power supply that improves the power factor by expanding the input current conduction angle over a wide range of the input voltage, removes the high frequency components of the input current to a level sufficient for a practical use, reduces the switching loss, and increases efficiency without increasing a size and a cost of a device.

Further objects and advantages of the invention will be apparent from the following description of the invention.

SUMMARY OF THE INVENTION

To solve the abovementioned problems, according to the first aspect of the invention, a switching power supply includes a noise filter; a bridge rectifying circuit connected to an AC power supply via the noise filter; a smoothing capacitor connected to an output side of the bridge rectifying circuit for smoothing a voltage output from the bridge rectifying circuit; a primary winding of a transformer and a switching element connected in series to one terminal of the smoothing capacitor; and a control circuit for controlling a switching operation of the switching element to adjust a DC voltage obtained by rectifying and smoothing the voltage on a secondary winding side of the transformer at a desired value based on a detected value of the DC voltage.

Further, the first reactor and the first diode are connected sequentially in series between one output terminal of the bridge rectifying circuit and one terminal of the smoothing capacitor. The second reactor and the second diode are connected in series between a node that mutually connects the first reactor and the first diode and a node that mutually connects the primary winding and the switching element.

According to the second aspect of the invention, a switching power supply includes a noise filter; a bridge rectifying circuit connected to an AC power supply via the noise filter; a smoothing capacitor connected to an output side of the bridge rectifying circuit for smoothing a voltage output from the bridge rectifying circuit; a primary winding of a transformer and a switching element connected in series to one terminal of the smoothing capacitor; and a control circuit for controlling a switching operation of the switching element to adjust a DC voltage obtained by rectifying and smoothing the voltage on a secondary winding side of the transformer at a desired value based on a detected value of the DC voltage.

Further, the first reactor is connected to a front of the bridge rectifying circuit. An anode of a diode is connected to each input terminal of the bridge rectifying circuit. The second reactor is connected between cathodes of these diodes and a node that mutually connects the primary winding and the switching element.

According to the third aspect of the invention, a switching power supply includes a noise filter; a bridge rectifying circuit connected to an AC power supply via the noise filter; a smoothing capacitor connected to an output side of the bridge rectifying circuit for smoothing a voltage output from the bridge rectifying circuit; a primary winding of a transformer and a main switching element connected in series to one terminal of the smoothing capacitor; and a control circuit for controlling a switching operation of the switching element to adjust a DC voltage obtained by rectifying and smoothing the voltage on a secondary winding side of the transformer at a desired value based on a detected value of the DC voltage.

Further, the first reactor and the first diode are connected sequentially in series between one output terminal of the bridge rectifying circuit and one terminal of the smoothing capacitor. The second reactor and the second diode are connected in series between a node that mutually connects the first reactor and the first diode and a node that mutually connects the primary winding and the main switching element.

Also, a snubber capacitor and the first feedback diode are each connected in parallel to the main switching element. Moreover, in order to) discharge the snubber capacitor, a closed loop circuit is formed of the snubber capacitor, a tertiary winding of the transformer, a diode, and an auxiliary switching element. The second feedback diode is connected parallel to the auxiliary switching element.

According to the fourth aspect of the invention, a switching power supply includes a noise filter; a bridge rectifying circuit connected to an AC power supply via the noise filter; a smoothing capacitor connected to an output side of the bridge rectifying circuit for smoothing a voltage output from the bridge rectifying circuit; a primary winding of a transformer and a main switching element connected in series to both terminals of the smoothing capacitor; and a control circuit for controlling a switching operation of the switching element to adjust a DC voltage obtained by rectifying and smoothing the voltage on a secondary winding side of the transformer at a desired value based on a detected value of the DC voltage.

Further, the first reactor is connected to a front of the bridge rectifying circuit. An anode of a diode is connected to each input terminal of the bridge rectifying circuit. The second reactor is connected between cathodes of these diodes and a node that mutually connects the primary winding and the main switching element.

Also, a snubber capacitor and the first feedback diode are connected parallel to the main switching element. Moreover, in order to discharge the snubber capacitor, a closed loop circuit is formed of the snubber capacitor, a tertiary winding of the transformer, a diode, and an auxiliary switching element. The second feedback diode is connected parallel to the auxiliary switching element.

According to the fifth aspect of the invention, in a switching power supply according to the second and fourth aspects, the noise filter includes a common mode reactor, and a leakage inductance thereof is replaced with the first reactor.

DETAILED DESCRIPTION OF PREFERRED EMBODIMENTS

Hereunder, embodiments of the present invention will be described with reference to the accompanying drawings.

Figure 1:
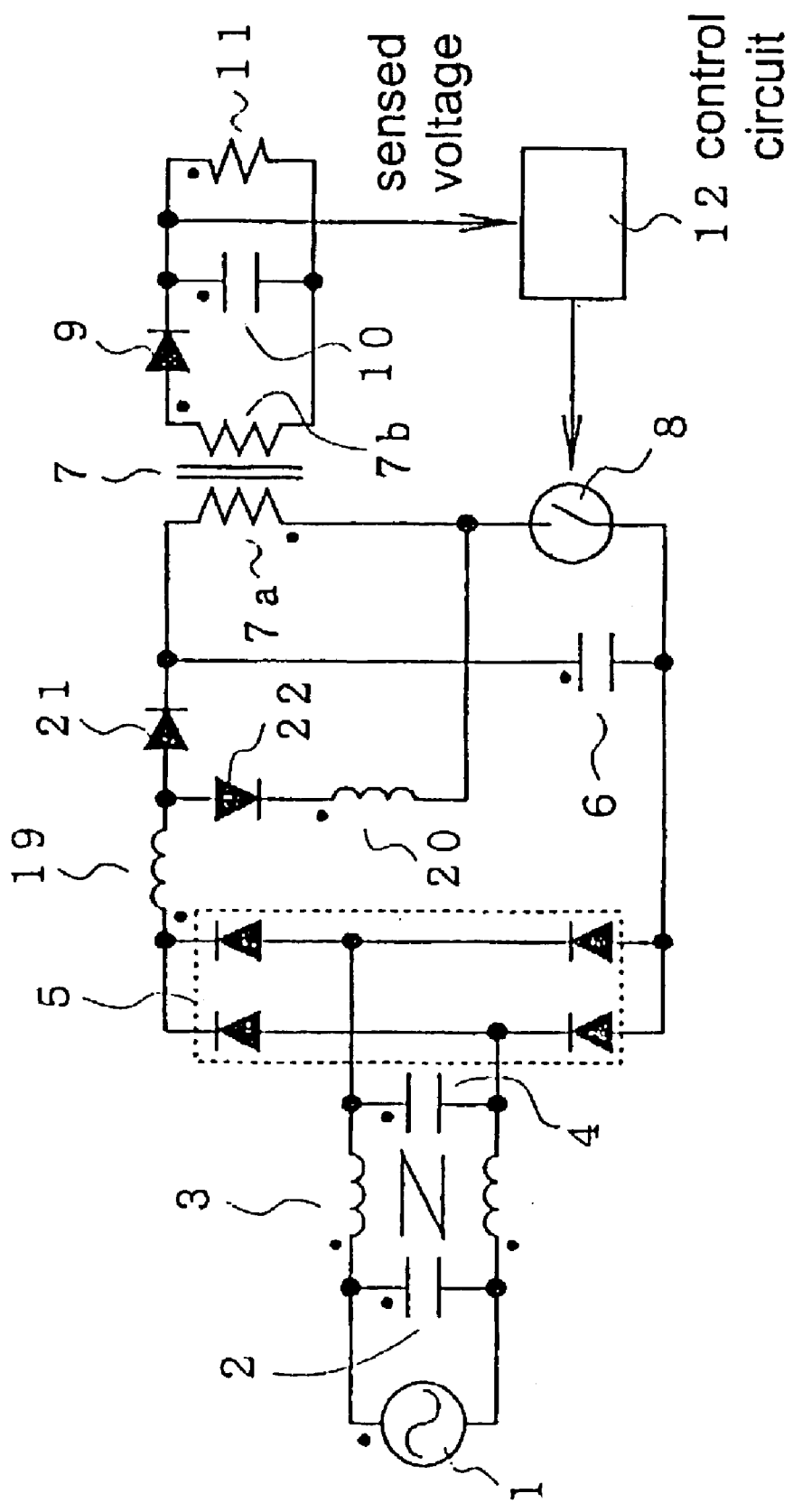
FIG. 1 is a circuit diagram showing the first embodiment of the present invention.
Figure 5:
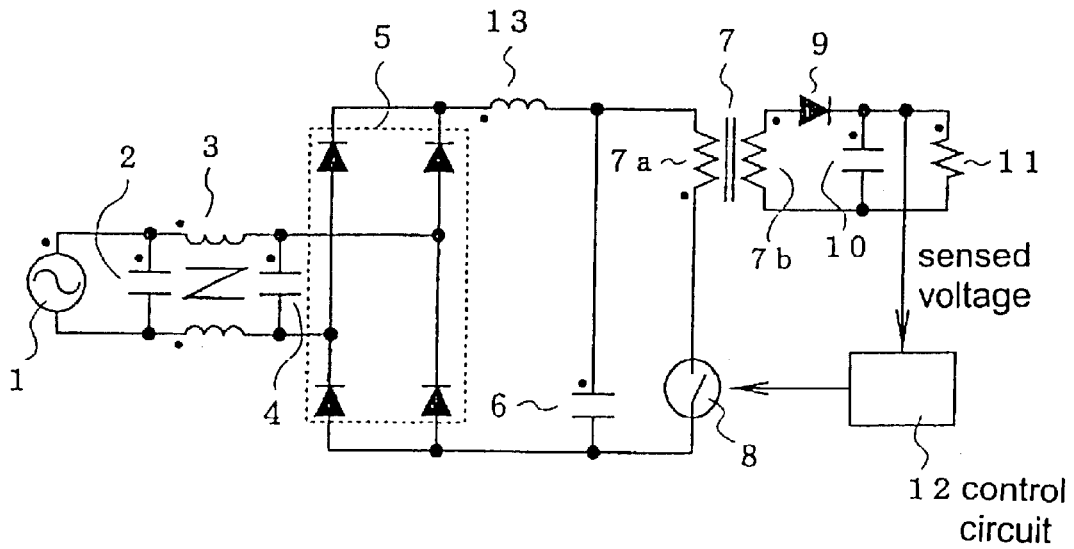
FIG. 5 is a circuit diagram showing prior art.
Figure 6:
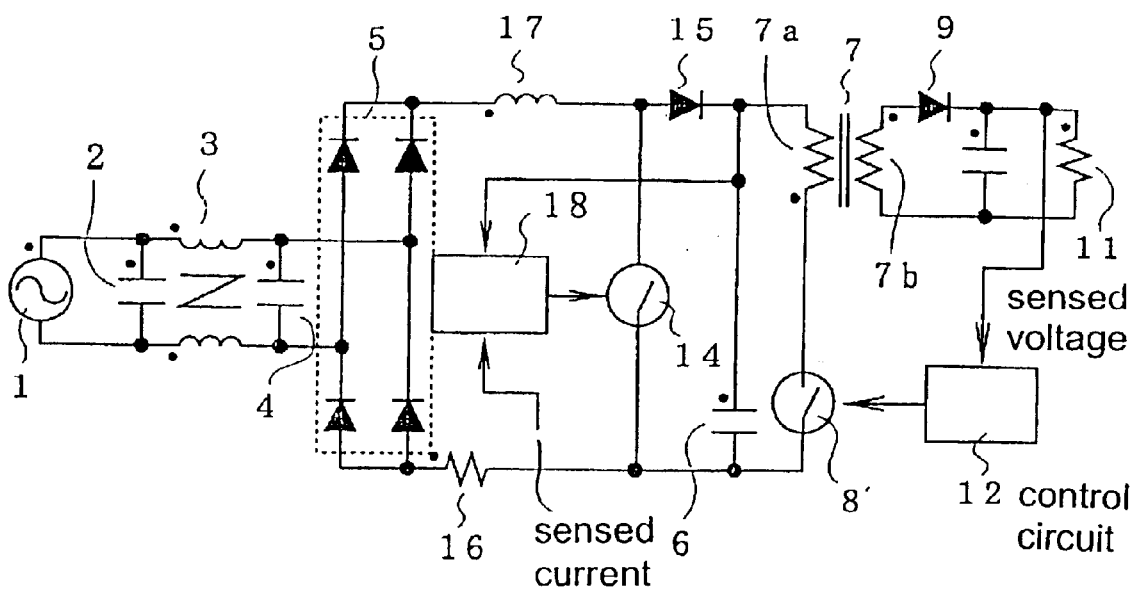
FIG. 6 is a circuit diagram showing prior art.

FIG. 1 is a circuit diagram illustrating the first embodiment of the present invention. The identical constituent elements to those in FIGS. 5 and 6 are assigned with the same reference numbers and a description thereof is omitted. The following description focuses on different parts. Note that various circuit configurations may be applicable to a noise filter. This embodiment corresponds to the first aspect of the invention.

In FIG. 1, one terminal of the first reactor 19 is connected to a positive-side output terminal of a bridge rectifying circuit 5, and the other terminal of the first reactor 19 is connected through the first diode 21 to one terminal of a smoothing capacitor 6. The other terminal of the first reactor 19 is also connected to a connecting node between a primary winding 7a of a transformer 7 and a switching element 8 through the second diode 22 and the second reactor 20.

Operations of a switching power supply concurrent with turn-on and turn-off of the switching element 8 will be described below in time sequence.

Interval 1

In the above configuration, when the switching element 8 turns on, a discharge current from the smoothing capacitor 6 flows along a path from the primary winding 7a of the transformer 7 to the switching element 8 to the smoothing capacitor 6, and therefore excitation energy is stored in the transformer 7 during this on-interval. Below, subsequent operation is explained chronologically.

A current to the reactor 19 flows from the AC supply 1 to the bridge rectifying circuit 5 through a noise filter comprised of capacitors 2 and 4 and a common mode reactor 3. Then, the current is divided into a current that flows along a path through the reactor 19, the diode 22, the reactor 20, the switching element 8, the bridge rectifying circuit 5 and an AC supply 1 (hereafter referred to as path 1) to excite the reactor 20, and a current that flows along a path through the reactor 19, the diode 21, the smoothing capacitor 6, the bridge rectifying circuit 5 and the AC supply 1 (hereafter referred to as path 2). While the switching element 8 is turned on, the current in the path 1 becomes zero.

Interval 2

Then, when the current in the path 2 becomes zero during an interval while the switching element 8 is turned on, the current flows only in the path 1. At that time, the current excites both reactors 19 and 20 with the AC supply 1 as a source of the current. A voltage applied to the reactors 19 and 20 is a value of the AC supply voltage divided by an impedance ratio based on their individual inductance values.

A controller 12 controls a switching operation of the switching element 8 to maintain the voltage applied to a load 11 at a desired value by performing PWM control of an on-interval of the switching element 8 at variable duty cycles.

Interval 3

During the off-interval of the switching element 8 turned off by a command from the control circuit 12, the energy stored in the transformer 7 is discharged to the smoothing capacitor 10 via a secondary winding 7b and the diode 9, and, then converted to DC power to the load 11.

The current of the reactor 19, which flows from the AC supply 1 via the bridge rectifying circuit 5 through the noise filter, is divided into a current that flows along a path through the reactor 19, the diode 22, the reactor 20, the primary winding 7a of the transformer 7, the smoothing capacitor 6, the bridge rectifying circuit 5 and the AC supply 1 (hereafter referred to as path 3) to cause the reactor 20 to discharge, and a current that flows along a path through the reactor 19, the diode 21, the smoothing capacitor 6, the bridge rectifying circuit 5, and the AC supply 1 (path 2).

At this time, the voltage applied to the reactor 20 has the same magnitude (with opposite polarity) as the voltage applied to the primary winding 7a of the transformer 7. A power source consisting of the voltage of the AC supply 1 and the voltage of the reactor 19 charges the smoothing capacitor 6. And, the current in the path 3 becomes zero.

Interval 4

When the current in the abovementioned path 3 becomes zero, the current flows only in the path 2, and a power source consisting of the voltage of the AC supply 1 and the voltage of the reactor 19 charges the capacitor 6.

In this manner, according to the switching operation of the switching element 8, the energy is supplied to the load 11 on the secondary-side of the transformer 7. Also, since the AC current can flow from the AC supply 1 even when the voltage of the AC supply 1 is less than that of the smoothing capacitor 6, the input-side power factor can be improved by expanding a conduction angle of the input current.

Additionally, the energy stored in the reactor 19 via the current flowing in the path 1 during the interval 2 is discharged to the smoothing capacitor 6 during the intervals 3, 4, and 1. Thus, the voltage of the smoothing capacitor 6 is boosted. If the boosted voltage exceeds the voltage of the smoothing capacitor 6, an AC current will flow from the AC supply 1, thereby expanding the conduction interval and improving the power factor.

Furthermore, since the voltage of the smoothing capacitor 6 is boosted, an effective current in the primary side winding 7a of the transformer 7 for supplying electrical power to the load 11 decreases. Consequently, a loss associated with the switching element 8 connected in series to the primary side winding 7a also decreases.

The boost voltage Vs of the smoothing capacitor 6 is expressed by Equation 1, where Vac is a peak voltage value of the AC supply 1, $L_{19}$ is an inductance of the reactor 19, $L_{20}$ is an inductance of the reactor 20, T is a switching cycle of the switching element 8, and $T_2$ is a time of aforementioned interval 2.

$$Vs = Vac \times \left(\frac{L_{19}}{L_{19} + L_{20}}\right) \times \left(\frac{T}{T - T_2} - 1\right) \qquad \text{Equation 1}$$

In other words, it is possible to set the boost voltage Vs of the smoothing capacitor 6 independently according to the inductance ratio of the reactors 19 and 20, regardless of the on and off intervals of the switching element 8. Therefore, it is possible to improve the power factor by boosting the voltage of the smoothing capacitor 6 over a wide range while using the single control circuit 12. Also, it is possible to set the boost voltage of the smoothing capacitor 6 at an appropriate value according to the inductance ratio of the reactors 19 and 20, even when the input voltage (AC voltage) is large. Thus, a capacitor with a low withstand voltage can be selected as the smoothing capacitor 6, thereby reducing a cost.

Furthermore, for the reactors 19 and 20, it is possible to use components with an inductance of several tens to several hundreds of $\mu$H for a high frequency application corresponding to a switching frequency of the switching element 8 (on the order of 100 kHz, for example), thereby realizing a small and low-cost switching power supply.

Figure 2:
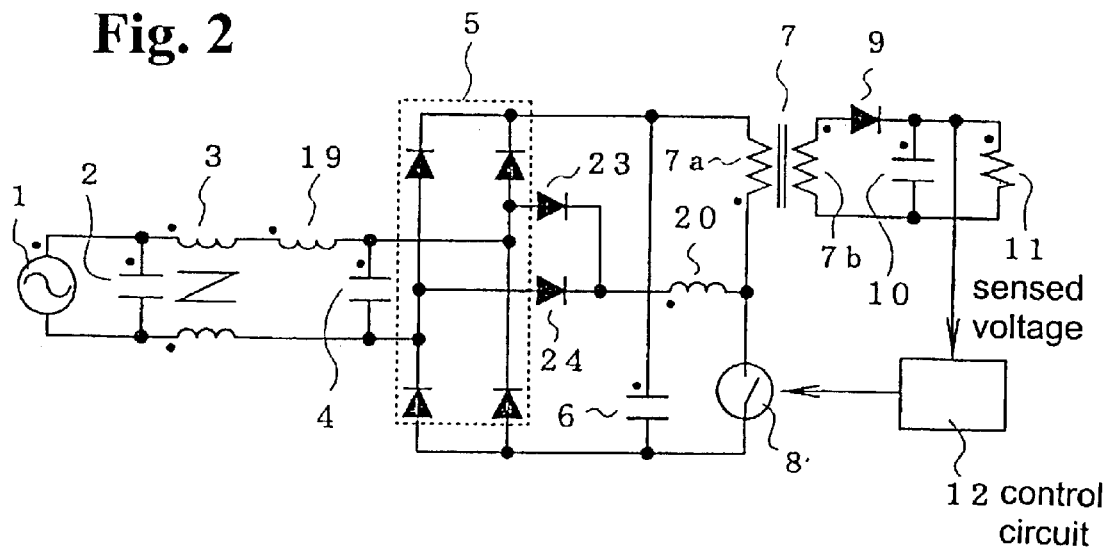
FIG. 2 is a circuit diagram showing the second embodiment of the present invention.

Next, FIG. 2 is a circuit diagram illustrating the second embodiment of the present invention, and corresponds to the second aspect of the invention.

In this embodiment, the first reactor 19 in FIG. 1 is inserted to the front of the bridge rectifying circuit 5. Moreover, each anode of diodes 23 and 24 is connected individually to an input terminal of the bridge rectifying circuit 5, and cathodes of the diodes 23 and 24 are connected to a node connecting the primary winding 7a and the switching element 8 through the reactor 20. In FIG. 2, the first reactor is inserted between the common mode reactor 3 and the capacitor 4. Various changes are possible for the configuration of this part depending on a structure of the noise filter. For example, the first reactor 19 may be inserted between the capacitor 4 and the bridge rectifying circuit 5. Any one of the capacitors 2 and 4 may be omitted. In FIG. 2, a capacitor may be disposed between the common mode reactor 3 and the reactor 19.

An operation of the switching power supply concurrent with the turn-on and turn-off of the switching element 8 according to the embodiment will be described below in time sequence.

Interval 1

When the switching element 8 is turned on, the current of the reactor 19, which flows from the AC supply 1 to the bridge rectifying circuit 5 through the common mode noise filter and the normal mode noise filter, is divided into a current that flows along a path through the reactor 19, the diode 23, the reactor 20, the switching element 8, the bridge rectifying circuit 5 and the AC supply 1 (hereafter referred to as path 1'), and excites the reactor 20, and a current that flows along a path through the reactor 19, the bridge rectifying circuit 5, the smoothing capacitor 6, the bridge rectifying circuit 5 and the AC supply 1 (hereafter referred to as path 2'). While the switching element 8 is turned on, the current in the path 2' becomes zero.

Interval 2

When the current in the path 2' becomes zero during the interval while the switching element 8 is turned on, the current flows only in the path 1'. At that time, the current excites both reactors 19 and 20 with the AC supply 1 as a source of the current. The voltage applied to the reactors 19 and 20 is a value of the AC supply voltage divided by an impedance ratio based on their individual inductance values.

Then, when the switching element 8 is turned off by a command from a control circuit 12 operating so as to maintain the voltage applied to the load 11 at a constant value, during that off-interval, energy stored in the transformer 7 is discharged through the secondary winding 7b, the diode 9, and the smoothing capacitor 10, and then is converted into the DC power for the load 11.

Interval 3

The current of the reactor 19, which flows from the AC supply 1 to the bridge rectifying circuit 5 through each noise filter, is divided into a current that flows along a path through the reactor 19, the diode 23, the reactor 20, the primary winding 7a, the smoothing capacitor 6, the bridge rectifying circuit 5 and the AC supply 1 (hereafter referred to as path 3'), and causes the reactor 20 to discharge, and a current that flows along the aforementioned path 2'. And, the current in the path 3' becomes zero.

Interval 4

When the current in the abovementioned path 3' becomes zero, the current flows only in the path 2'. And, the power source consisting of the voltage of the AC supply 1 and the voltage of the reactor 19 charges the smoothing capacitor 6.

According to this embodiment, the same effect as that of the first embodiment can be obtained. Moreover, the reactor 19 is used also as a constituent element of a noise filter, thereby utilizing the circuit components of the normal mode filter more effectively.

Figure 3:
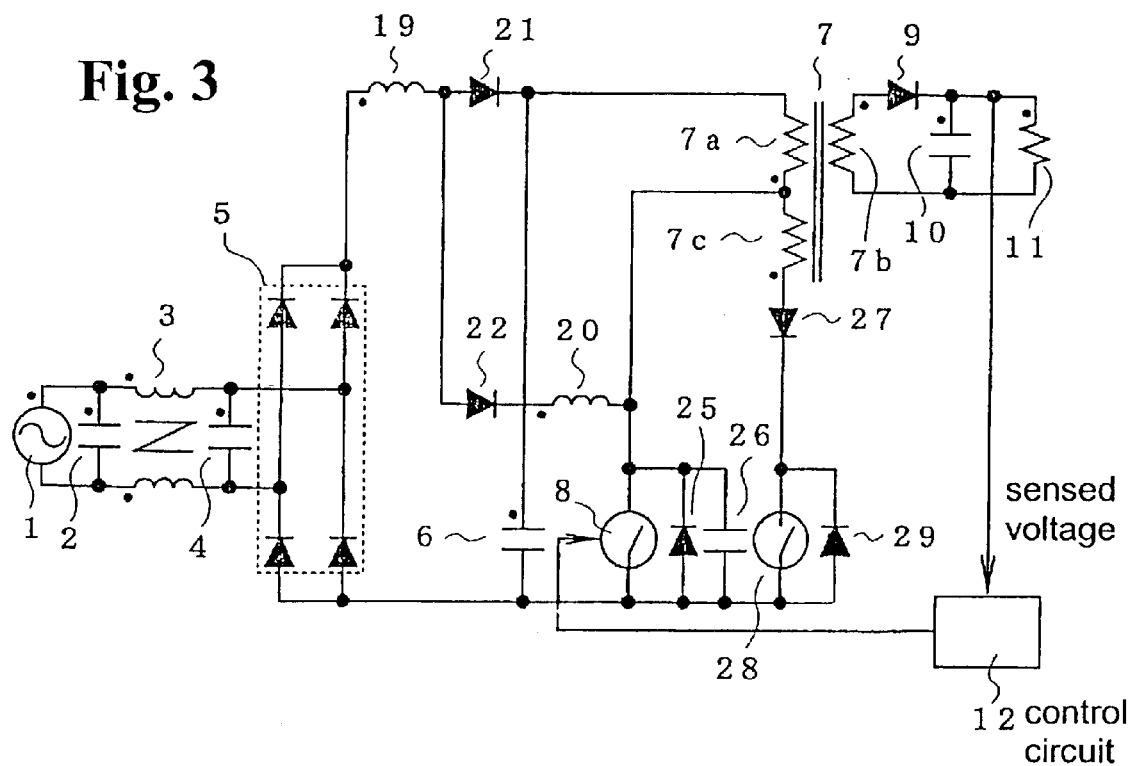
FIG. 3 is a circuit diagram showing the third embodiment of the present invention.

Next, FIG. 3 is a circuit diagram illustrating the third embodiment of the present invention, and corresponds to the third aspect of the invention.

Main differences between the third embodiment and the first embodiment will be described. First, a snubber capacitor 26 and the first feedback diode 25 are connected parallel to the switching element 8. Second, in order to cause the snubber capacitor 26 to discharge, a closed loop circuit is comprised of the snubber capacitor 26, a tertiary winding 7c of the transformer 7 (connected in series to the primary winding 7a), a diode 27 and a switching element 28. Further, the second feedback diode 29 is connected parallel to the aforementioned switching element 28. Other structures are the same as those in FIG. 1. For convenience, the switching element 8 is called a main switching element, and the switching element 28 is called an auxiliary switching element.

Hereunder, an operation of this embodiment is explained. The basic operation of the switching power supply, which supplies the DC voltage to the load according to the turn-on and turn-off operation of the main switching element 8, is the same as that of the first embodiment. Thus, differences in operation associated with the differences in the circuit configuration from the first embodiment will be explained below.

When the auxiliary switching element is turned on before the main switching element 8 is turned on, the charge stored in the snubber capacitor 26 discharges along a path through the snubber capacitor 26, the tertiary winding 7c of the transformer 7, the diode 27, and the auxiliary switching element 28. This discharge current excites the tertiary winding 7c, stores excitation energy in the transformer 7, and flows along a path through the snubber capacitor 26, the primary winding 7a, and the smoothing capacitor 6. When the main switching element 8 is turned on after the electrical discharge, the main switching element 8 turns on with zero-voltage-switching, in which both terminals of the switching element have zero voltage, thereby generating no switching loss.

Moreover, when the main switching element 8 turns off, the snubber capacitor 26 is at zero voltage. Thus, a voltage is applied to the main switching element 8 when the current flowing through the main switching element 8 while turned on flows to the snubber capacitor 26 to charge the same. Therefore, when the main switching element 8 is turned off, the voltage is zero to cause the zero-voltage-switching, thereby generating no switching loss.

Accordingly, the main switching element 8 performs soft switching when it is turned-on and turned-off. Further, since the smoothing capacitor 6 regenerates the energy of the snubber capacitor 26, the switching loss of the main switching element 8 can be reduced, thereby increasing efficiency of the switching power supply.

Figure 4:
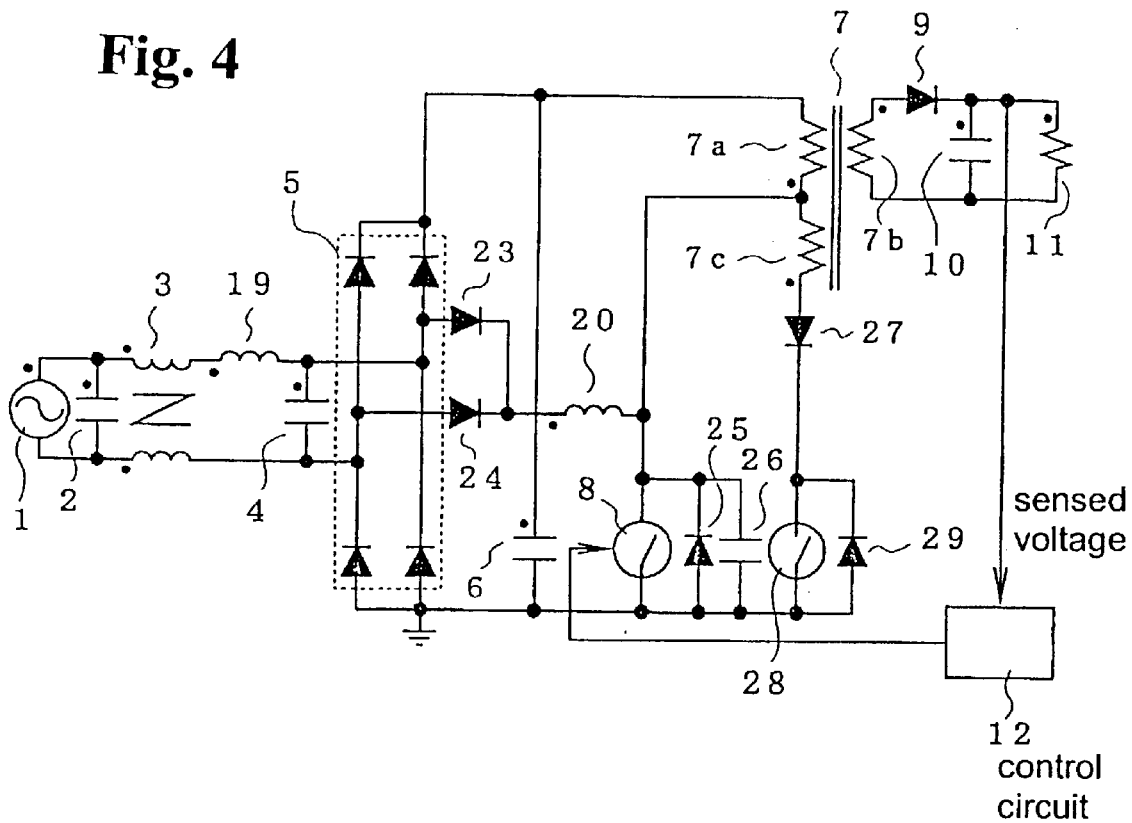
FIG. 4 is a circuit diagram showing the fourth embodiment of the present invention.

FIG. 4 is a circuit diagram illustrating the fourth embodiment of the present invention, and corresponds to the fourth aspect of the invention. This embodiment is based on the second embodiment with an addition of a coupled structure comprised of the main switching element 8, the auxiliary switching element 28, the feedback diodes 25 and 29, the snubber capacitor 26 and the tertiary winding 7c of the third embodiment. Other structures are the same as those of the second embodiment.

Here, the basic operation of this embodiment as a switching power supply is the same as that of the second embodiment. Also, the soft switching of the main switching element 8 to decrease the switching loss and the regeneration of the energy of the snubber capacitor 26 are the same as those of the third embodiment. Additionally, in this embodiment, as in the second embodiment, the reactor 19, disposed in the front of the bridge rectifying circuit 8, has the effect of reducing the normal mode noise.

Furthermore, the configuration, wherein the first reactor is inserted in the front of the bridge rectifying circuit as described above in connection with the second and fourth embodiments, makes it possible to use the leakage inductance of the common mode reactor 3 in substitution for the first reactor 19. The substitution facilitates reducing the number of the constituent parts and elements, reducing the manufacturing costs and reducing the weight of the switching power supply. Specifically, these are achieved by implementing a design such that the leakage inductance of the common mode reactor 3 takes on the same value as the first reactor 19.

A way of designing will be described below in detail. In order to correspond to world wide input voltage (from 100 V to 240 V), a switching power supply is designed so that a capacitor, the breakdown voltage of which is 450 V, may be used for smoothing capacitor 6 even when the input voltage is boosted to the upper limit of the above described voltage range. General purpose capacitors with low costs are usable for the capacitor, the break down voltage of which is 450 V. A switching power supply should be designed such that the voltage applied to the smoothing capacitor 6 is 420 V or lower to secure a leeway of around 10% for the smoothing capacitor 6.

For example, if AC power supply variation of about 10% is added to the above described voltage range, the maximum input voltage (effective value) will be 264 V. Since the sum of the peak input voltage described above and the voltage boost Vs should be 420 V or lower for designing a switching power supply, the voltage boost Vs should be 45 V or lower.

Furthermore, in the case where the transformer 7 is designed such that the time T2 of the interval 2 at the maximum load becomes approximately 20% relative to the switching cycle T of the main switching element 8 at an input voltage of 264 V, a ratio ($L_{19}/L_{20}$) of the reactors $L_{19}$ (400 $\mu$H) and the reactor $L_{20}$ in Equation 1 of the boost voltage Vs is selected to be less than 0.938. In actual applications, the value of reactor $L_{19}$ is set at a value to be effective as a noise filter, and thus the value of reactor $L_{20}$ is selected such that the ratio does not exceed 0.938.

As set forth above, according to the present invention, the power factor is improved by expanding the conduction angle of the input current over a wide range of the input voltage. Further, the high frequency components contained in the input current can be suppressed to a set value or below, as prescribed by specifications or the like, so as not to interfere with a practical application. Also, the main switching element loss and the capacitor withstand voltage are reduced to provide a highly efficient and low cost switching power supply.

While the invention has been explained with reference to the specific embodiments, the explanation is illustrative and the invention is limited only by the appended claims.

What is claimed is:

1. A switching power supply for supplying constant DC power to a load, comprising;

an AC power supply, a noise filter connected to the AC power supply, a bridge rectifying circuit connected to the noise filter, a smoothing capacitor connected to an output side of the bridge rectifying circuit for smoothing a voltage outputted from the bridge rectifying circuit, a transformer having a primary winding connected to the smoothing capacitor, and a secondary winding to be connected to the load, a main switching element connected to the smoothing capacitor in series with the primary winding of the transformer, a control circuit connected to the secondary winding of the transformer and the main switching element for detecting a DC voltage at the secondary winding of the transformer to control the main switching element so that the DC voltage to the load is adjusted to a desired value, a first reactor and a first diode disposed in series between the bridge rectifying circuit and the smoothing capacitor, and a second reactor and a second diode disposed in series between a first node connecting the first reactor and the first diode and a second node connecting the primary winding of the transformer and the main switching element.

2. A switching power supply according to claim 1, further comprising a snubber capacitor connected parallel to the main switching element, a first feedback diode connected parallel to the main switching element, a tertiary winding formed in the transformer connected to the primary winding, a third diode connected to the tertiary winding, an auxiliary switching element connected to the third diode so that a closed loop circuit formed of the snubber capacitor, tertiary winding, third diode and auxiliary switching element is formed to discharge a charge of the snubber capacitor, and a second feedback diode connected parallel to the auxiliary switching element.

3. A switching power supply for supplying constant DC power to a load, comprising;

an AC power supply, a noise filter connected to the AC power supply, a bridge rectifying circuit connected to the noise filter and having input terminals, a smoothing capacitor connected to an output side of the bridge rectifying circuit for smoothing voltage output from the bridge rectifying circuit, a transformer having a primary winding connected to the smoothing capacitor, and a secondary winding to be connected to the load, a main switching element connected to the smoothing capacitor in series with the primary winding of the transformer, a control circuit connected to the secondary winding of the transformer and the main switching element for detecting a DC voltage at the secondary winding of the transformer to control the main switching element so that the DC voltage to the load is adjusted to a desired value, a first reactor disposed between the noise filter and one of the input terminals of the bridge rectifying circuit, diodes having cathodes and anodes, said anodes being connected to the input terminals of the bridge rectifying circuit, and a second reactor disposed between the cathodes of the diodes and a node connecting the primary winding of the transformer and the main switching element.

4. A switching power supply according to claim 3, further comprising a snubber capacitor connected parallel to the main switching element, a first feedback diode connected parallel to the main switching element, a tertiary winding formed in the transformer connected to the primary winding, a third diode connected to the tertiary winding, an auxiliary switching element connected to the third diode so that a closed loop circuit formed of the snubber capacitor, tertiary winding, third diode and auxiliary switching element is formed to discharge a charge of the snubber capacitor, and a second feedback diode connected parallel to the auxiliary switching element.

5. A switching power supply according to claim 3, wherein said noise filter includes a common mode reactor so that leakage inductance thereof operates as the first reactor.

6. A switching power supply according to claim 1, further comprising a smoothing circuit connected to the secondary winding to rectify and smooth a voltage at the secondary winding, an output of the smoothing circuit being supplied to the control circuit.

* * * * *